United States Patent
Al-Hawaj (10) Patent No.: US 9,709,027 B1
(45) Date of Patent: Jul. 18, 2017

(54) DRIVE SYSTEM FOR WIND TURBINE WITH CONTRA-ROTATING GENERATOR

(71) Applicant: KUWAIT UNIVERSITY, Safat (KW)

(72) Inventor: Osama M. Al-Hawaj, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 15/001,202

(22) Filed: Jan. 19, 2016

(51) Int. Cl.
| | |
|---|---|
| F16H 7/00 | (2006.01) |
| F03D 9/00 | (2016.01) |
| H02P 9/04 | (2006.01) |
| F03D 1/02 | (2006.01) |
| F03D 80/80 | (2016.01) |
| F03D 15/00 | (2016.01) |
| F03D 1/06 | (2006.01) |

(52) U.S. Cl.
CPC ........... *F03D 1/025* (2013.01); *F03D 1/0666* (2013.01); *F03D 9/002* (2013.01); *F03D 15/00* (2016.05); *F03D 80/88* (2016.05)

(58) Field of Classification Search
CPC ....... F03D 15/00; F03D 1/025; Y02E 10/722; Y02E 10/725; F05B 2260/4021
USPC .......................................................... 474/84
See application file for complete search history.

(56) References Cited

U.S. PATENT DOCUMENTS

| | | | | |
|---|---|---|---|---|
| 4,130,172 A * | 12/1978 | Moody | ................... | B60K 1/00 180/350 |
| 4,813,917 A * | 3/1989 | Borden | .................... | B62M 9/04 474/160 |
| 5,506,453 A * | 4/1996 | McCombs | .............. | F03D 1/025 290/44 |
| 6,749,532 B2 * | 6/2004 | Wachauer | ................ | B60K 1/00 180/65.6 |
| 7,466,053 B1 * | 12/2008 | Radev | ...................... | H02K 1/32 310/114 |
| 8,253,294 B1 * | 8/2012 | Wishart | ............... | H02K 16/005 310/115 |
| 8,727,921 B2 * | 5/2014 | Bertolotti | .............. | F03D 1/0658 474/87 |
| 2004/0096327 A1 * | 5/2004 | Appa | ...................... | F03D 1/025 416/1 |
| 2007/0202976 A1 * | 8/2007 | Luedtke | .................... | B60L 7/10 474/70 |
| 2000/0197639 | | 8/2008 | Brander | |
| 2008/0197639 A1 * | 8/2008 | Brander | ................. | F03D 1/025 290/55 |

(Continued)

FOREIGN PATENT DOCUMENTS

FR          2 603 952          3/1988

*Primary Examiner* — Henry Liu
(74) *Attorney, Agent, or Firm* — Richard C. Litman (57) ABSTRACT

The drive system for wind turbine with contra-rotating generator includes various embodiments of belt drive pulley systems for a direct drive contra-rotating wind generator. The generator has a magnetic rotor and an armature mounted on a shaft configured to rotate in the opposite direction from the magnetic rotor. In some embodiments, a belt extends across two pairs of coaxially mounted idler pulleys between a pulley on the magnetic rotor shaft and a pulley on the armature shaft. In other embodiments, the pulleys on the magnetic rotor and armature shafts are double sheave pulleys, and a first belt extends across one or two coaxial pair(s) of idler pulleys between an inner and outer sheave, and a second belt extends across one or two coaxial pair(s) of idler pulleys between an inner and outer sheave. Either the magnetic rotor or the armature shaft or both are coupled to a wind turbine rotor.

19 Claims, 10 Drawing Sheets

(56) References Cited

U.S. PATENT DOCUMENTS

| | | | | |
|---|---|---|---|---|
| 2008/0272596 | A1* | 11/2008 | House | F16H 9/18 |
| | | | | 290/44 |
| 2011/0077113 | A1* | 3/2011 | Mizzi | F03B 13/1865 |
| | | | | 474/84 |
| 2011/0281677 | A1* | 11/2011 | Tjensvoll | F03D 11/028 |
| | | | | 474/148 |
| 2012/0046140 | A1* | 2/2012 | Shelef | F16H 49/001 |
| | | | | 475/182 |
| 2012/0112459 | A1* | 5/2012 | Crowe | F03D 3/061 |
| | | | | 290/44 |
| 2012/0308387 | A1* | 12/2012 | Himmelmann | F16H 1/22 |
| | | | | 416/170 R |
| 2013/0052013 | A1* | 2/2013 | Eckart | F03D 7/0272 |
| | | | | 416/9 |
| 2013/0202437 | A1* | 8/2013 | Himmelmann | F16H 49/00 |
| | | | | 416/170 R |
| 2013/0294916 | A1* | 11/2013 | Himmelmann | F16H 7/06 |
| | | | | 416/170 R |
| 2013/0296087 | A1* | 11/2013 | Himmelmann | F16G 13/06 |
| | | | | 474/209 |
| 2014/0011617 | A1* | 1/2014 | Montag | B66C 23/84 |
| | | | | 474/148 |
| 2014/0021722 | A1* | 1/2014 | Jakubaszek | F03B 17/061 |
| | | | | 290/55 |
| 2014/0265345 | A1* | 9/2014 | Grieve | F03D 15/00 |
| | | | | 290/55 |
| 2015/0008678 | A1* | 1/2015 | Goldstein | F03D 5/02 |
| | | | | 290/55 |
| 2016/0169207 | A1* | 6/2016 | Baun | F16G 9/00 |
| | | | | 290/55 |

* cited by examiner

DRIVE SYSTEM FOR WIND TURBINE WITH CONTRA-ROTATING GENERATOR

BACKGROUND OF THE INVENTION

1. Field of the Invention

The present invention relates to wind turbines, and particularly to a drive system for a wind turbine with a contra-rotating generator, i.e., a generator having a magnetic rotor and an armature rotating in opposite directions.

2. Description of the Related Art

The use of wind turbines as a source of electricity has been gaining in popularity over the years, since wind turbines utilize wind to produce electricity instead of burning fossil fuels that produce large amounts of pollution that can adversely affect our health and the environment. One type of widely used turbine is the single rotor horizontal axis wind turbine that typically includes a single rotor having a plurality of blades and a generator having a magnetic rotor member that rotates in the field of a stator fixed to the generator housing. Since the single rotor horizontal axis wind turbine only has a single rotor, it can only utilize wind energy coming from a single direction. A significant portion of wind energy, including the wind flowing downstream of the rotor, therefore remains unused. Also, having a single rotor can typically only produce a relatively small rotational speed, which results in a minimal amount of electricity. To compensate for the relatively small rotational speed generated by the single rotor wind turbines, manufacturers typically increase the span of the rotor blades to provide more torque and power capture.

This, however, can require a larger generator design, which, in turn, can result in an excessively heavy wind turbine, costly construction, as well as increased bearing friction. Further, during periods of gusty winds, large torque can be transmitted to the bearing and support structure, thereby shortening the life span of the wind turbine.

The issues resulting from the single rotor wind turbine have sparked renewed interest in the dual counter-rotating wind turbine, in particular, the counter-rotating horizontal axis wind turbine (CR-HAWT). In this type of wind turbine, a contra-rotating generator replaces the unidirectional rotor of the single rotor wind turbines. An upwind rotor is directly fixed to the magnetic rotor member, and a downwind rotor is directly fixed to the armature rotor member, which are coaxial. The contra-rotating wind generator captures an additional portion of the otherwise wasted wind energy from the tangential air downstream from the upwind rotor and also increases the amount of mechanical energy captured due to the increase in the relative rotational speed within the gap between the magnetic rotor and the armature rotor. However, the contra-rotating generator can produce a significant amount of unnecessary vibration. Further, a sudden increase in torque resulting from gusty wind conditions subjecting the upwind rotor to a large amount of torque while the downwind rotor lags behind, which can also result in catastrophic failure.

Thus, a drive system for wind turbine with contra-rotating generator solving the aforementioned problems is desired.

SUMMARY OF THE INVENTION

The drive system for wind turbine with contra-rotating generator includes various embodiments of belt drive pulley systems for a direct drive contra-rotating wind generator. The generator has a magnetic rotor and an armature mounted on a shaft configured to rotate in the opposite direction from the magnetic rotor. In one embodiment, a belt extends across two pairs of coaxially mounted idler pulleys between a pulley on the magnetic rotor shaft and a pulley on the armature shaft. In another embodiment, the pulleys on the magnetic rotor and armature shafts are double sheave pulleys, and a first belt extends across one coaxial pair of idler pulleys between an inner and outer sheave, and a second belt extends across a second coaxial pair of idler pulleys between an inner and outer sheave. In a third embodiment, the pulleys on the magnetic rotor and armature shafts are double sheave pulleys, and a first belt extends across first and second coaxial pairs of idler pulleys between an inner and outer sheave, and a second belt extends across third and fourth coaxial pairs of idler pulleys between an inner and outer sheave. Either the magnetic rotor or the armature shaft or both are rigidly coupled to a wind turbine rotor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The drive system for wind turbine with contra-rotating generator includes various embodiments of belt drive pulley systems for a direct drive contra-rotating wind generator. The generator has a magnetic rotor and an armature mounted on a shaft configured to rotate in the opposite direction from the magnetic rotor. In one embodiment, a belt extends across two pairs of coaxially mounted idler pulleys between a pulley on the magnetic rotor shaft and a pulley on the armature shaft. In another embodiment, the pulleys on the magnetic rotor and armature shafts are double sheave pulleys, and a first belt extends across one coaxial pair of idler pulleys between the inner sheaves, and a second belt extends across a second coaxial pair of idler pulleys between the outer sheaves. In a third embodiment, the pulleys on the magnetic rotor and armature shafts are double sheave pulleys, and a first belt extends across first and second coaxial pairs of idler pulleys between the inner sheaves, and a second belt extends across third and fourth coaxial pairs of idler pulleys between the outer sheaves. Either the magnetic rotor or the armature shaft or both are rigidly coupled to a wind turbine rotor.

In all of the embodiments of the drive system, the wind turbine has a contra-rotating generator, i.e., the generator has a rotor equipped with permanent magnets or electromagnets on a rotating shaft and an armature coil mounted on a shaft, the rotor shaft and the armature shaft being aligned coaxially and configured to rotate in opposite directions, providing relative movement so that movement of the armature coils through the magnetic field provided by the rotor induces an electromotive force (EMF) and current in the armature coils, which may be recovered by slip rings or the like in conventional manner for use as a power source. In all of the embodiments of the drive system, the wind turbine also has at least one rotating element that is also referred to as a rotor, having a central hub mounted on a shaft and a plurality of blades extending radially from the hub that are adapted to capture wind energy to rotate the hub and the shaft extending therefrom. In order to provide clarity, in the following description and claims the generator rotor is referred to as a "magnetic rotor", and the wind turbine rotor(s) is referred to as a "propeller rotor" or a "wind turbine rotor".

Figure 1:
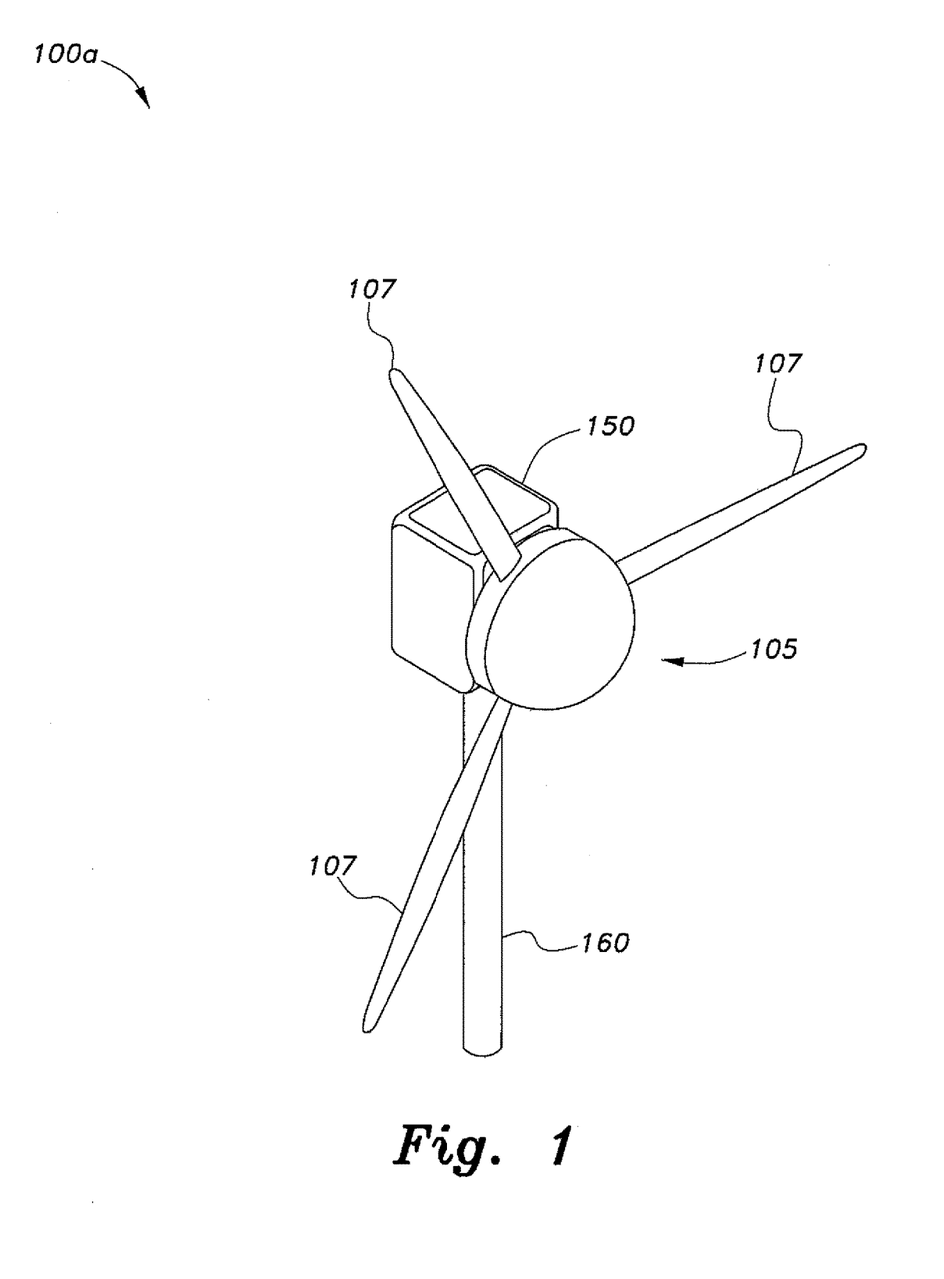
FIG. 1 is a perspective view of a wind turbine having a single wind turbine rotor and having the drive system for wind turbine with contra-rotating generator according to the present invention housed therein.
Figure 2:
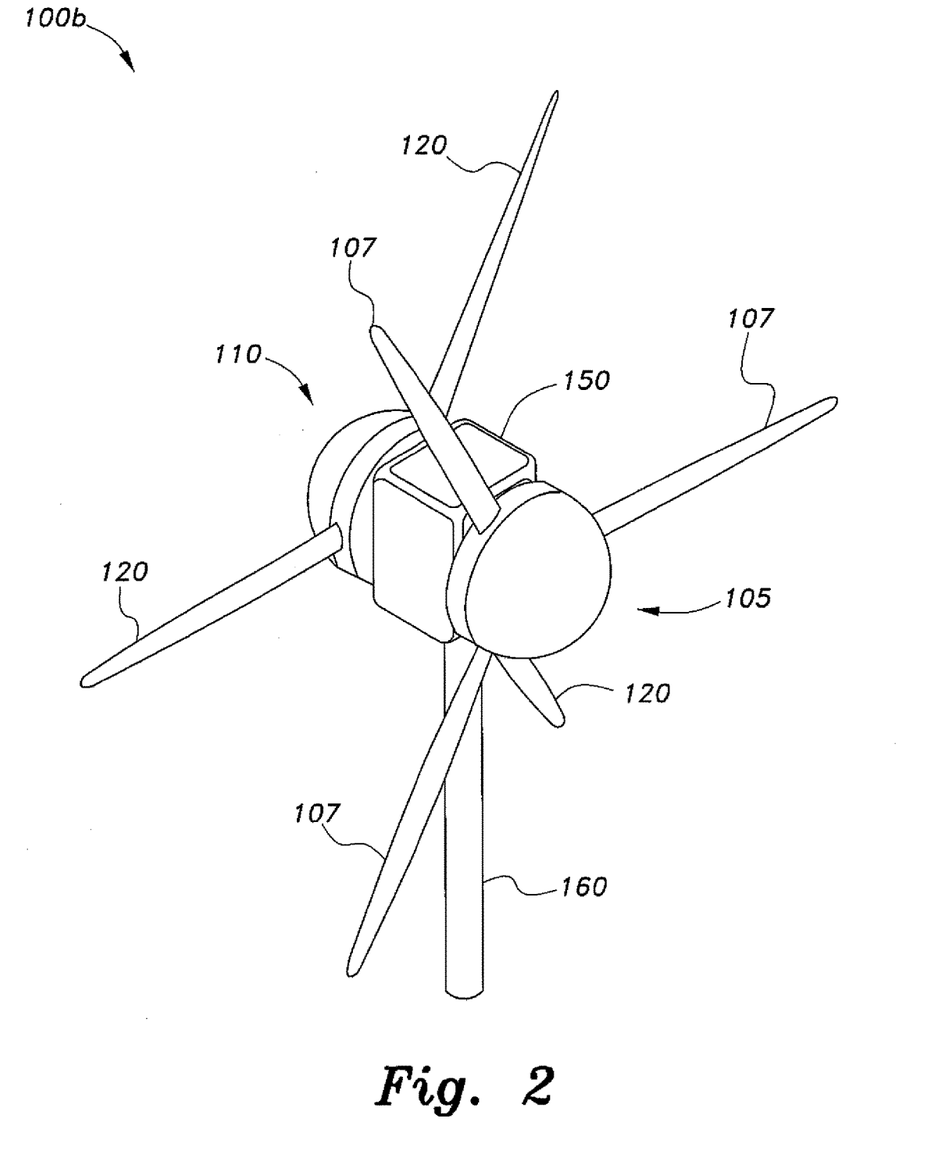
FIG. 2 is a perspective view of a contra-rotating wind turbine having a drive system for wind turbine with contra-rotating generator according to the present invention housed therein.

FIGS. 1 and 2 depict a single propeller rotor wind turbine 100a and a double propeller rotor wind turbine 100b, respectively. The single propeller rotor wind turbine 100a includes a first propeller rotor 105 having a plurality of propeller rotor blades 107. The dual rotor wind turbine 100b, on the other hand, includes both the first propeller rotor 105 and a second propeller rotor 110 configured to rotate in the opposite direction from the first propeller rotor 105, i.e., the wind turbine 100b has contra-rotating propeller rotors. The wind turbines 100a, 100b include a nacelle housing 150 having a suitable shape, which may be streamlined or rectangular, as shown in the drawings. The housing 150 is rotatably mounted on a support, such as a pole 160, having a suitable length, so that the propeller rotor 105 may turn into the wind. The housing 150 is configured for protecting the drive assembly 200.

The propeller rotors 105, 110 can be any suitable propeller rotors known in the art. Further, the propeller rotor blades 107, 120 of the first propeller rotor 105 and of the second propeller rotor 110, respectively, can be formed from any suitable material, such as metal, and have any shape, i.e. curvature, that utilizes as much wind flow as possible to maximize rotation speed and, in turn, electricity production. Further, the housing 150 can be made from any type of suitable material, such as metal, to protect the drive assembly 200 disposed inside the housing 150.

FIGS. 3-7, depict a drive system, generally illustrated as 200, according to the present teachings. The drive system 200 for wind turbines 100a, 100b includes a contra-rotating generator 300 coupled to a belt-pulley assembly, including various embodiments of a belt-drive assembly 400a-400d described herein.

Figure 3:
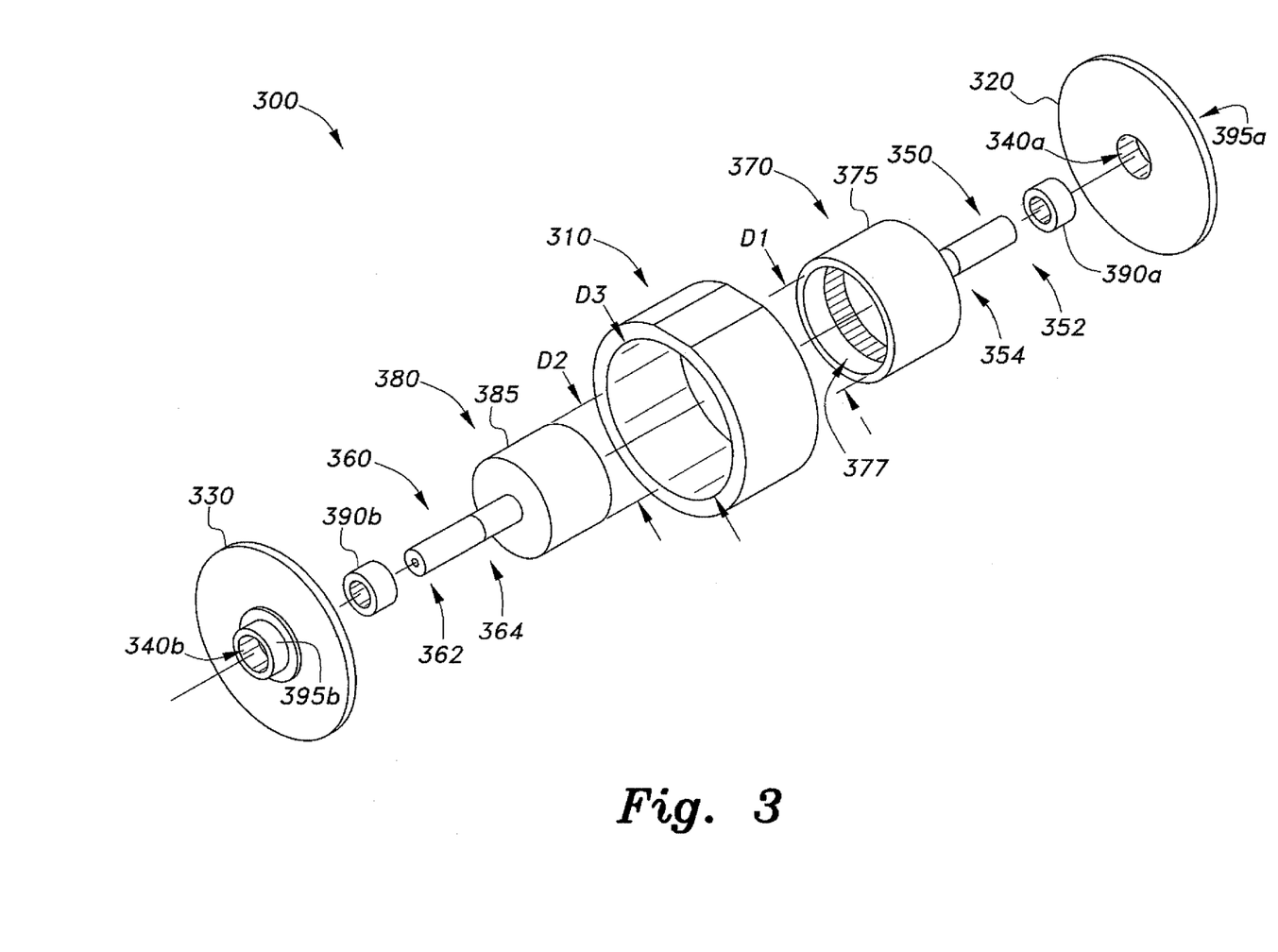
FIG. 3 is an exploded view of a contra-rotating generator assembly for a drive system for wind turbine with contra-rotating generator according to the present invention.

Referring to FIG. 3, the contra-rotating generator 300 includes a first shaft 350 having a first end 352 that may be rigidly coupled to the first propeller rotor 105 of the wind turbine 100a, 100b for rotation therewith, and a second end 354 coupled to a magnetic rotor 370 having a cup-shaped housing 375. The magnetic field may be provided by permanent magnets 377 or electromagnets mounted in or on the cup-shaped housing 375. The generator 300 also includes a second shaft 360 having a first end 362 that may be rigidly coupled to the second propeller rotor 110 of the dual rotor wind turbine 100b for rotation therewith, and a second end 364 coupled to an armature rotor 380 having a cup-shaped housing 385, the armature coils being mounted in or on the cup-shaped housing 385. The cup-shaped housings 375, 385 are dimensioned and configured so that the housing 385 of the armature rotor 380 is positioned within the housing 375 of the magnetic rotor 370, the generator being configured so that the magnetic rotor 370 can rotate in one direction and the armature rotor 380 can rotate in the opposite direction, the relative movement of the armature coil in the magnetic field generating electricity. It is to be understood that the armature of the contra-rotating generator 300 can be connected to any load, such as a power storage source (not shown), such as a battery, or to electrical grids or electrical components that require electricity.

The contra-rotating generator 300 also includes a casing 310, such as a ring casing, configured for covering the housing 375 of the magnetic rotor 370, and a plurality of end caps, such as a first end cap 320 and a second end cap 330, each end cap 320, 330 including a corresponding opening 340a, 340b, the end caps 320, 330 being configured for covering the sides of the casing 310. A plurality of bearings, such as a first bearing 390a positioned on the first shaft 350 and a second bearing 390b positioned on the second shaft 360, are mounted in the end caps 320, 330, the bearings 390a, 390b being configured for reducing friction resulting from the rotation of the first shaft 350 within the opening 340a of the first end cap 320, as well as the friction resulting from the rotation of the second shaft 360 within the opening 340b of the second end cap 330. A plurality of end flanges, such as a first end flange 395a positioned within the opening 340a of the first end cap 320 and a second end flange 395b positioned within the opening 340b of the second end cap 330, are configured for preventing the bearings 390a, 390b from detaching.

The housing 375 of the magnetic rotor 370 can be formed from any suitable material, such as metal, such as aluminum, and can have an annular shape having a first diameter D1 The housing 385 of the armature rotor 380 can be formed from any suitable material, such as metal, and can have an annular shape having a second diameter D2, wherein the first diameter D1 of the housing 375 of the magnetic rotor 370 is greater than the second diameter D2 of the housing 385 of the armature rotor 380, such that the housing 385 of the armature 380 can fit within the housing 375 of the magnetic rotor 370. The casing 310 of the contra-rotating generator 300 can be formed from any type of suitable material, such as aluminum or other metal, and a can have a third diameter D3, wherein the third diameter D3 is greater than the first diameter D1, such that the housing 375 of the magnetic rotor 370 including the housing 385 of the armature 380 can be positioned within the casing 310.

Further, each of the plurality of end caps 320, 330 can be formed from any suitable material, such as metal, and can have a substantially circular shape, including a diameter equal to the third diameter D3, such that each of the end caps 320, 330, can cover the sides of the casing 310. The first shaft 350 and the second shaft 360 can be formed from any suitable material and have any length suitable to extend through the openings 340a, 340b in the respective end caps 320, 330. It is to be noted that the first shaft 350 and the second shaft 360 can be connected to the first propeller rotor 105 and to the second propeller rotor 110 by any suitable means known in the art.

Figure 4:
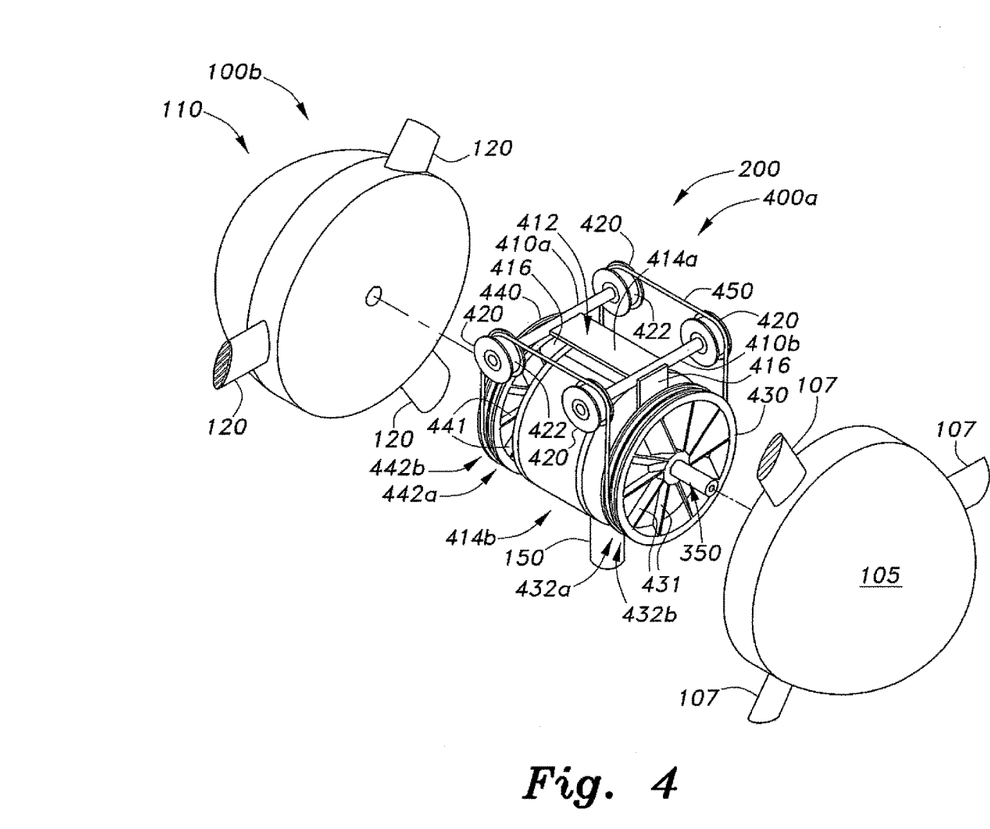
FIG. 4 is a partially exploded perspective view of a first embodiment of a drive system for wind turbine with contra-rotating generator according to the present invention, the turbine having contra-rotating propeller rotors, the housing being removed to show the drive system having one belt and six pulleys.

FIG. 4 depicts a first embodiment of the belt-pulley assembly, generally designated 400a, for use in connection with the drive system 200. It is to be understood that the drive system 400a, as well as the other embodiments described herein, can be used in conjunction with the single rotor wind turbine 100a or the dual rotor wind turbine 100b to reduce the effect of vibration and noise on the wind turbine 100a, 100b, as well as to protect the dual rotor wind turbine 100b against failure, including a catastrophic failure, resulting from gusty conditions in which the rotation of the first propeller rotor 105 lags behind the rotation of the second propeller rotor 110 or vice-versa, by providing a counter-balance acting torque to provide a braking effect for the first propeller rotor 105. Further, synchronizing the rotation of both rotors 105, 110 can allow for efficient operation and wind capture under an extended range of conditions.

The belt-pulley assembly 400a includes a support structure 412 having a first horizontal support panel 414a and a second horizontal support panel 414b and a plurality of vertical support panels 416 vertically disposed between the first horizontal support panel 414a and the second horizontal support panel 414b, each of the plurality of vertical support panels 416 having a centralized opening 418 (seen more clearly in FIG. 5C) through which the shafts 350, 360 can extend. A plurality of primary shafts, such as a first primary shaft 410a and a second primary shaft 410b, are mounted on the support structure 412. For example, the first primary shaft 410a and the second primary shaft 410b are shown horizontally disposed on opposing ends of the first horizontal support panel 414a in FIG. 4.

The belt-pulley assembly 400a includes a plurality of idler pulley wheels 420, each of the idler pulley wheels 420 being coaxially positioned on each primary shaft 410a, 410b. A first primary pulley wheel 430 having a centralized opening 445a (seen more clearly in FIG. 5C) is rigidly mounted onto the first shaft 350 of the contra-rotating generator 300. A second primary pulley wheel 440 having a centralized opening 445b (seen more clearly in FIG. 5C) is rigidly mounted onto the second shaft 360 of the contra-rotating generator 300. An endless belt 450 is trained on each primary pulley wheel 430,440 and each of the plurality of idler pulley wheels 420. It is to be understood that both the first primary pulley wheel 430 and the second primary pulley wheel 440 can include vanes or blades 431, 441 extending radially up to the rim of the wheels for cooling the contra-rotating generator 300 as the primary pulley wheels 430, 440 rotate.

As shown in FIG. 4, the belt 450 passes over each of the idler wheels 420 and under each of the primary pulley wheels 430, 440. The primary shafts 410a, 410b for the four idler wheels 420 are disposed in a horizontal plane that is elevated vertically over the plane of the shafts of the primary pulley wheels 430, 440. This configuration of the pulley wheels and the belt gives the belt 450 an inverted "U" shape when viewed from the side, and constrains the primary pulley wheels 430, 440 to rotate in opposite directions, i.e., if primary pulley wheel 430 rotates clockwise, then primary pulley wheel 440 rotates counterclockwise, and vice versa. This configuration can be used with two contra-rotating propeller rotors 105, 110, as shown in FIG. 4, or with a single propeller rotor that can be attached to either the magnetic rotor shaft 350 or the armature shaft 360 of the contra-rotating generator 300.

Each of the plurality of idler pulley wheels 420 includes a groove defining a track 422 along the circumference of each idler pulley wheel 420, the track 422 being configured for substantially preventing the endless belt 450 from detaching from any of the idler pulley wheels 420 of the belt-pulley system 400a. It is to be noted that each of the plurality of idler pulley wheels 420 is disposed between the primary pulley wheels 430, 440.

Figure 5A:
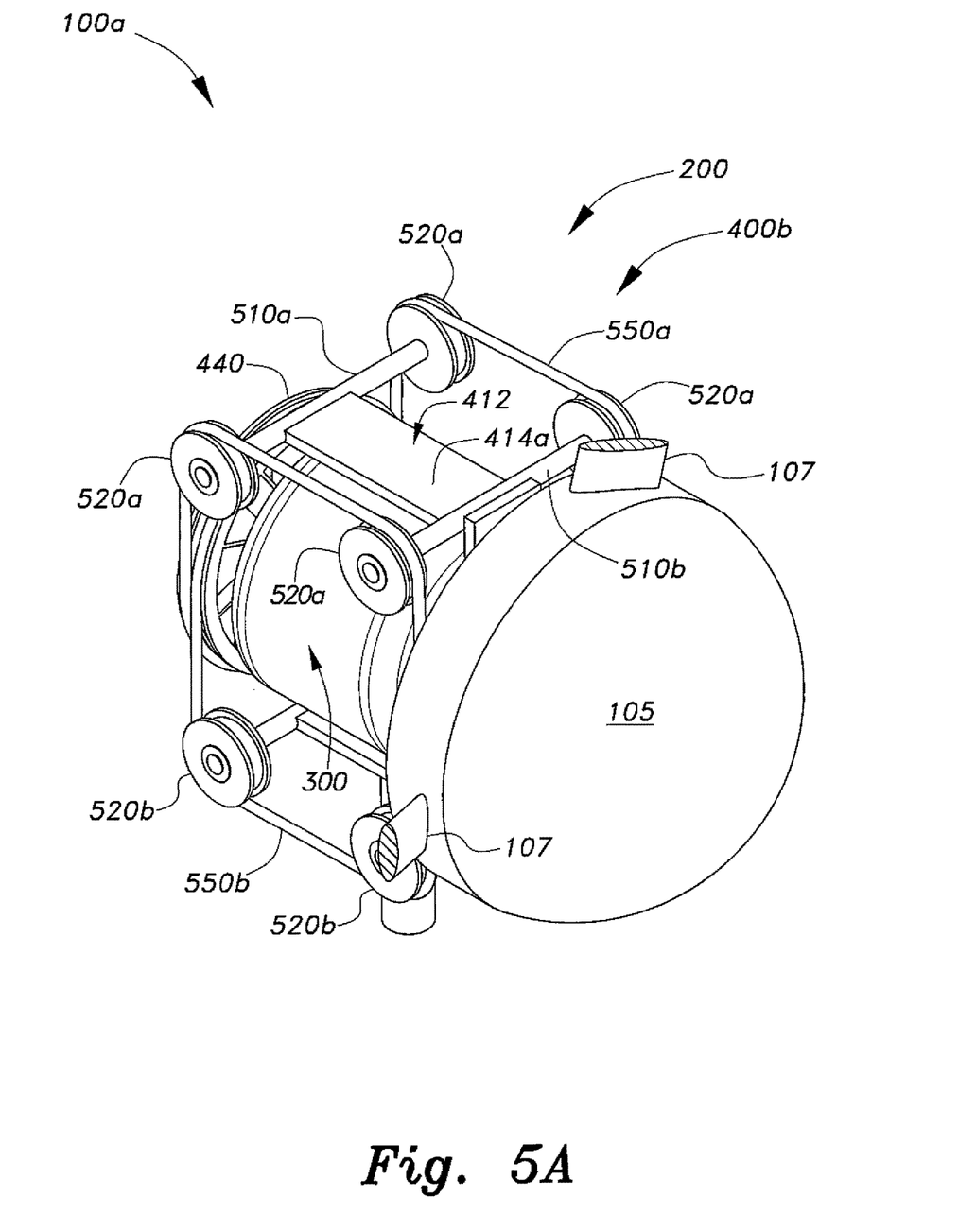
FIG. 5A is a perspective view of a second embodiment of a drive system for wind turbine with contra-rotating generator according to the present invention, the turbine having a single propeller rotor, the housing being removed to show the drive system having two belts and ten pulleys, the propeller blades being broken away and in section.
Figure 5B:
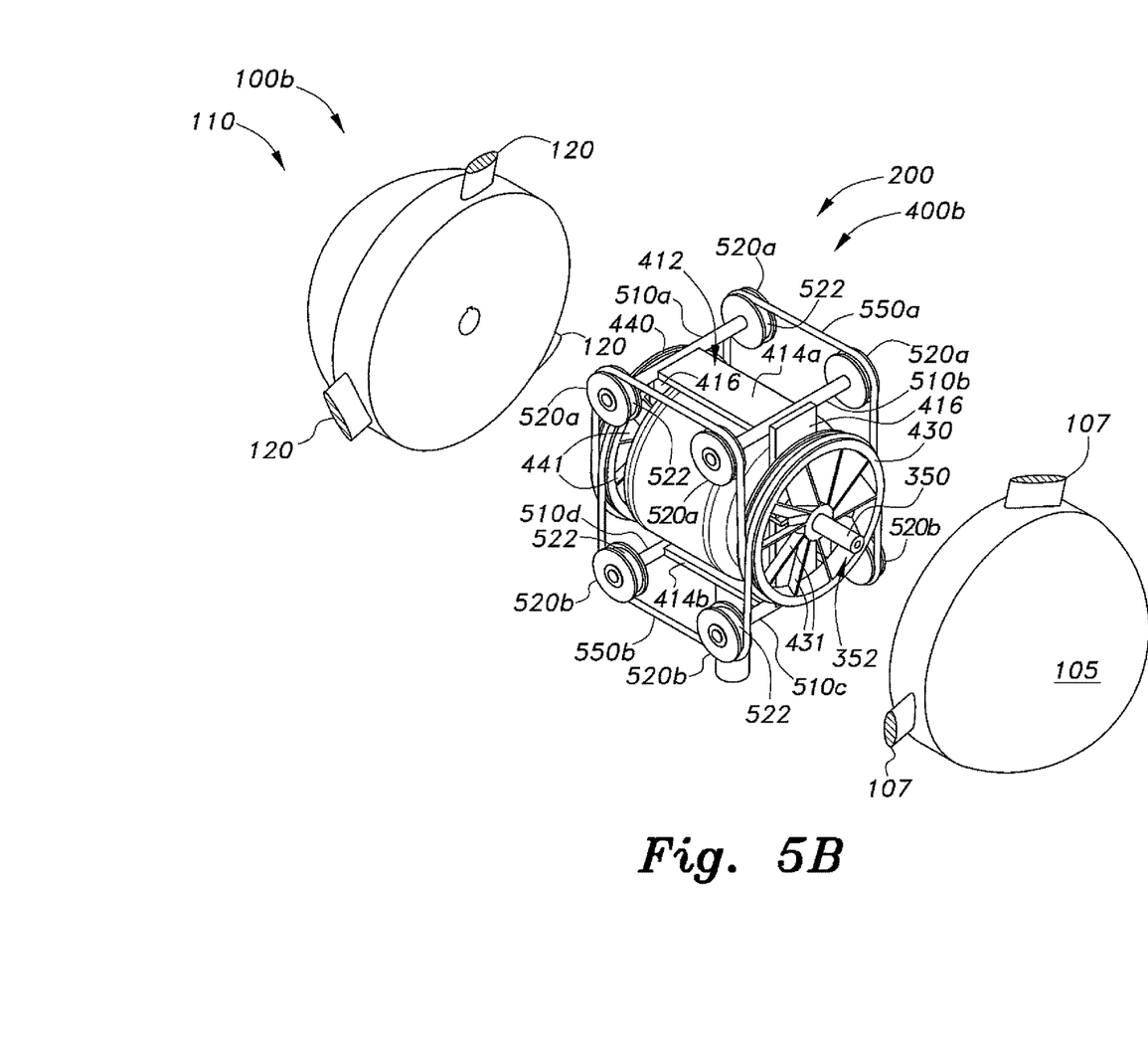
FIG. 5B is a partially exploded perspective view of a third embodiment of a drive system for wind turbine with contra-rotating generator according to the present invention, the turbine having contra-rotating propeller rotors, the housing being removed to show the drive system having two belts and ten pulleys, the propeller blades being broken away and in section.
Figure 5C:
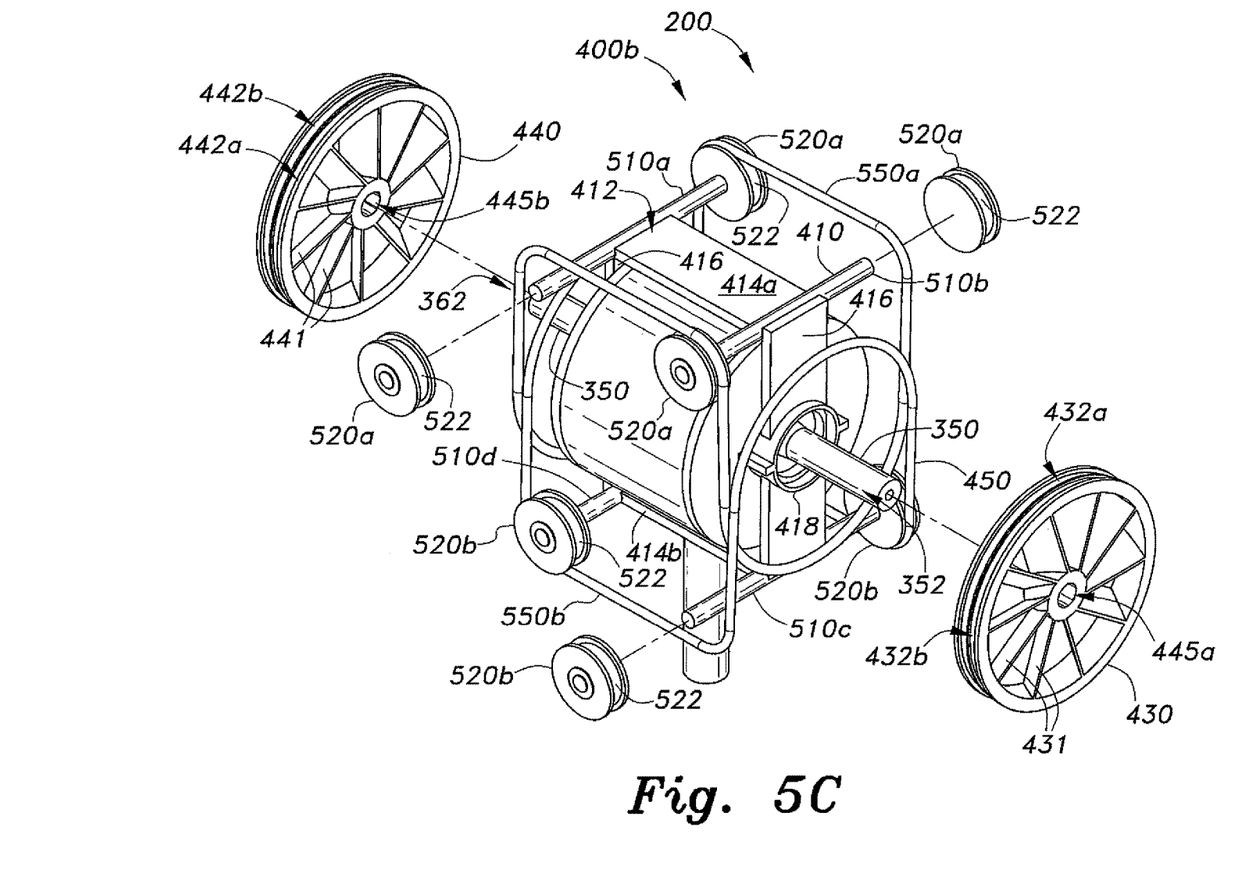
FIG. 5C is a partially exploded perspective view of the drive system of FIGS. 5A and 5B, showing further details thereof.
Figure 5D:
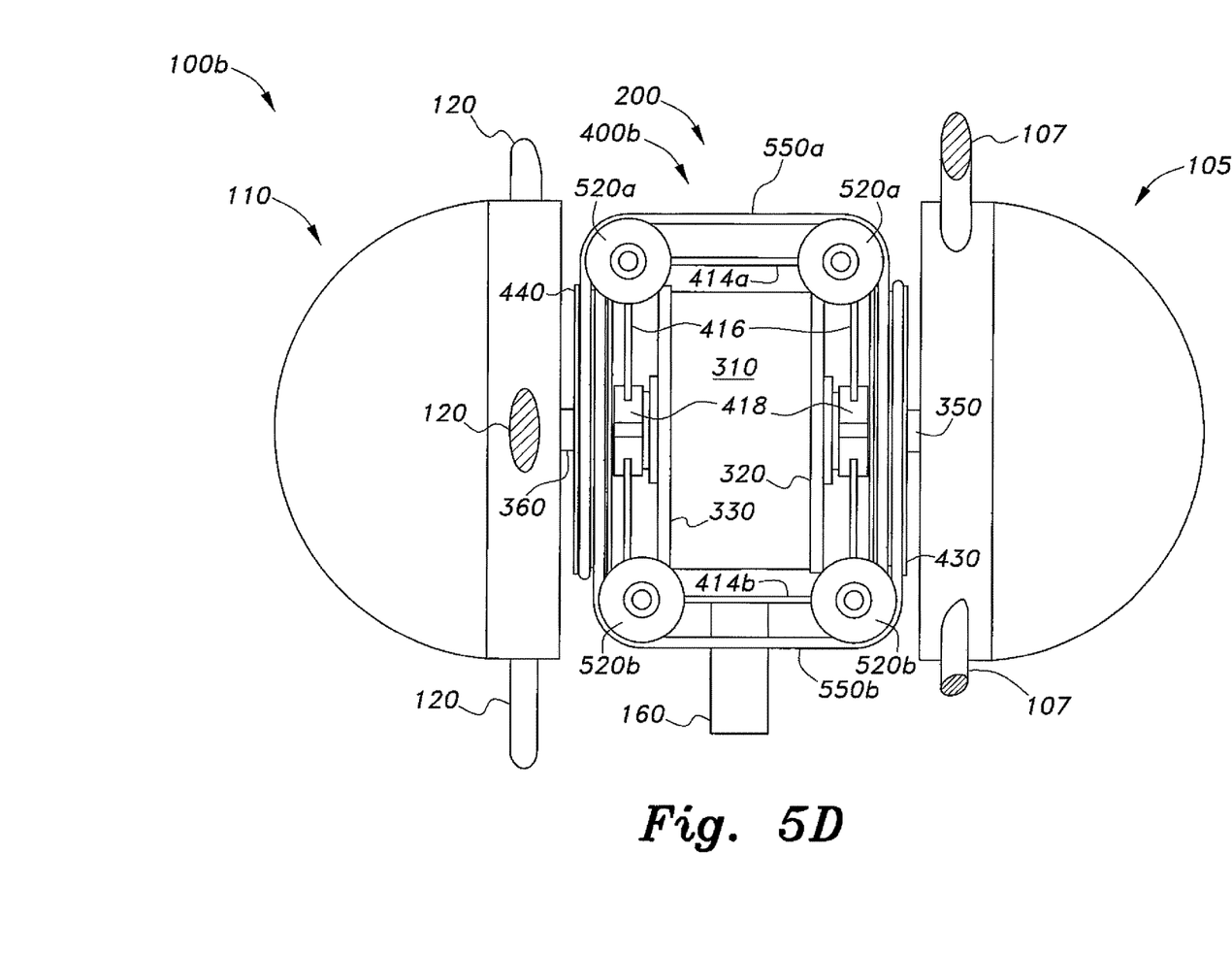
FIG. 5D is a side view of the wind turbine of FIG. 5B, the housing being removed to show details of the drive system.

FIGS. 5A through 5D depict a second configuration of a belt-pulley assembly, generally designated 400b, that can be used in connection with the drive assembly 200. The belt-pulley assembly 400b is substantially similar to the belt-pulley assembly 400a. Like the belt-pulley assembly 400a, the belt-pulley assembly 400b can be used in conjunction with the single rotor wind turbine 100a, as illustrated in FIG. 5A, as well as in connection with the dual rotor wind turbine 100b, as illustrated in FIGS. 5B-5D.

Unlike the belt-pulley assembly 400a, however, the belt-pulley assembly 400b includes four of primary shafts, including a first primary shaft 510a, a second primary shaft 510b, a third primary shaft 510c, and a fourth primary shaft 510d, each of the plurality of primary shafts 510a-510d being horizontally disposed on the support structure 412. A plurality of idler pulley wheels 520a, 520b are coaxially disposed at opposite ends of each primary shaft 510a-510d. A first endless belt 550a and a second endless belt 550b are trained on each of the idler pulley wheels 520a, 520b, as well as on the first primary pulley wheel 430 and the second primary pulley wheel 440, which are each double sheave pulley wheels.

The plurality of idler pulley wheels includes a first or upper set of idler pulley wheels 520a and a second or lower set of idler pulley wheels 520b.

The first endless belt 550a is positioned within the track 522 of each of the upper idler pulley wheels 520a coaxially positioned on the first primary shaft 510a and the second primary shaft 510b, as well as within the first or inner groove 432a of the first primary pulley wheel 430 and within the second or outer groove 442b of the second primary pulley wheel 440, passing over the idler wheels 520a and under the primary wheels 430, 440 so that the belt 550a is in an inverted "U" configuration when viewed from the side. The second endless belt 550b is positioned within the track 522 of each of the lower idler pulley wheels 520b coaxially positioned on the third primary shaft 510c and the fourth primary shaft 510d, as well as within the second or outer groove 432b of the first primary pulley wheel 430 and within the first or inner groove 442a of the second primary pulley wheel 440, passing under the idler wheels 520b and over the primary wheels 430, 440 so that the belt 550b is in a substantially "U"-shaped configuration when viewed from the side, the two belts 550a, 550b defining a substantially rectangular configuration when viewed from the side, as seen in FIG. 5D. This configuration constrains the primary pulley wheels 430, 440 to rotate in opposite directions, and can be used with two contra-rotating propeller rotors 105, 110, as shown in FIGS. 5B-5D, or with a single propeller rotor that can be attached to either the magnetic rotor shaft 350 or the armature shaft 360 of the contra-rotating generator 300, as shown in FIG. 5A. The plurality of endless belts 550a, 500b allows for balancing forces as a result of the endless belt's 550a, 550b tensions on the respective shafts 350, 360, and can provide twice the traction available with a single belt, thereby allowing for the transmission of larger torque.

Figure 6:
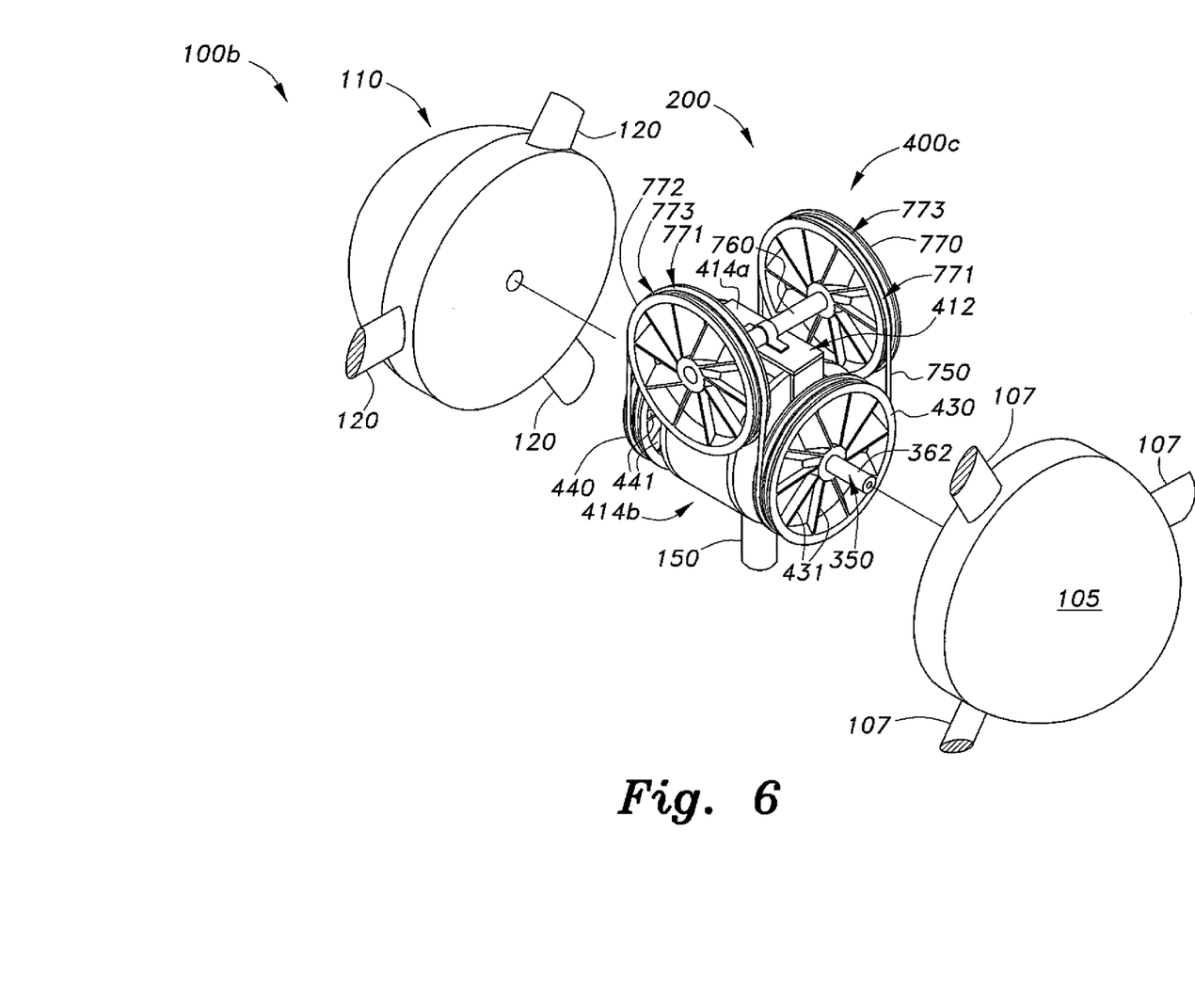
FIG. 6 is a partially exploded perspective view of a fourth embodiment of a drive system for wind turbine with contra-rotating generator according to the present invention, the turbine having contra-rotating propeller rotors, the housing being removed to show the drive system having one belt and four pulleys, the propeller blades being broken away and in section.

FIG. 6 depicts a third configuration of a belt-pulley assembly, generally designated 400c, that can be used in connection with the drive assembly 200. The belt-pulley assembly 400c is substantially similar to the belt-pulley assembly 400a. Similar to the belt-pulley assembly 400a, the belt-pulley assembly 400c includes an endless belt 750. However, the belt-pulley assembly 400c includes a single secondary shaft 760 rigidly mounted on the first horizontal support panel 414a, such as on the center of the first horizontal support panel 414a, of the support structure 412, and a pair of large idler pulley wheels, such as a first large idler pulley wheel 770 and a second large idler pulley wheel 772, coaxially positioned on opposite ends of the secondary shaft 760 between the first primary pulley wheel 430 and the second primary pulley wheel 440. It is to be noted that similar to the primary pulley wheels 430,440, each of the large idler pulley wheels 770, 772 can have a first groove 771 and a second groove 773 configured for guiding the endless belt 750 throughout the belt-pulley system 400c.

Similar to the belt-pulley assembly 400a, 400b, the endless belt 750 can be trained in the first groove 432a of the first primary pulley wheel 430, the first groove 771 of the first large idler pulley wheel 770, the second groove 442b of the second primary pulley wheel 440, and in the first groove 771 of the second large idler pulley wheel 772, the belt 750 passing under the primary wheels 430, 440 and over the idler wheels 770, 772, constraining the primary pulley wheels 430, 440 to rotate in opposite directions. It is to be noted that the large idler pulley wheels 770, 772 of the embodiment 400c can have a greater diameter than the idler pulleys 420, 520a-520b in order to withstand more wind power, i.e., torque, than can be absorbed by the belt-pulley assemblies 400a, 400b. Additionally, having fewer moving parts, such as in the belt-pulley assembly 400c, may decrease maintenance and other such repair costs. Although shown in FIG. 6 in use with a wind turbine having contra-rotating propeller rotors 105, 110, the belt drive mechanism of FIG. 6 may also be used in a wind turbine having a single propeller rotor, which may be attached to either the magnetic rotor shaft or the armature shaft.

Figure 7:
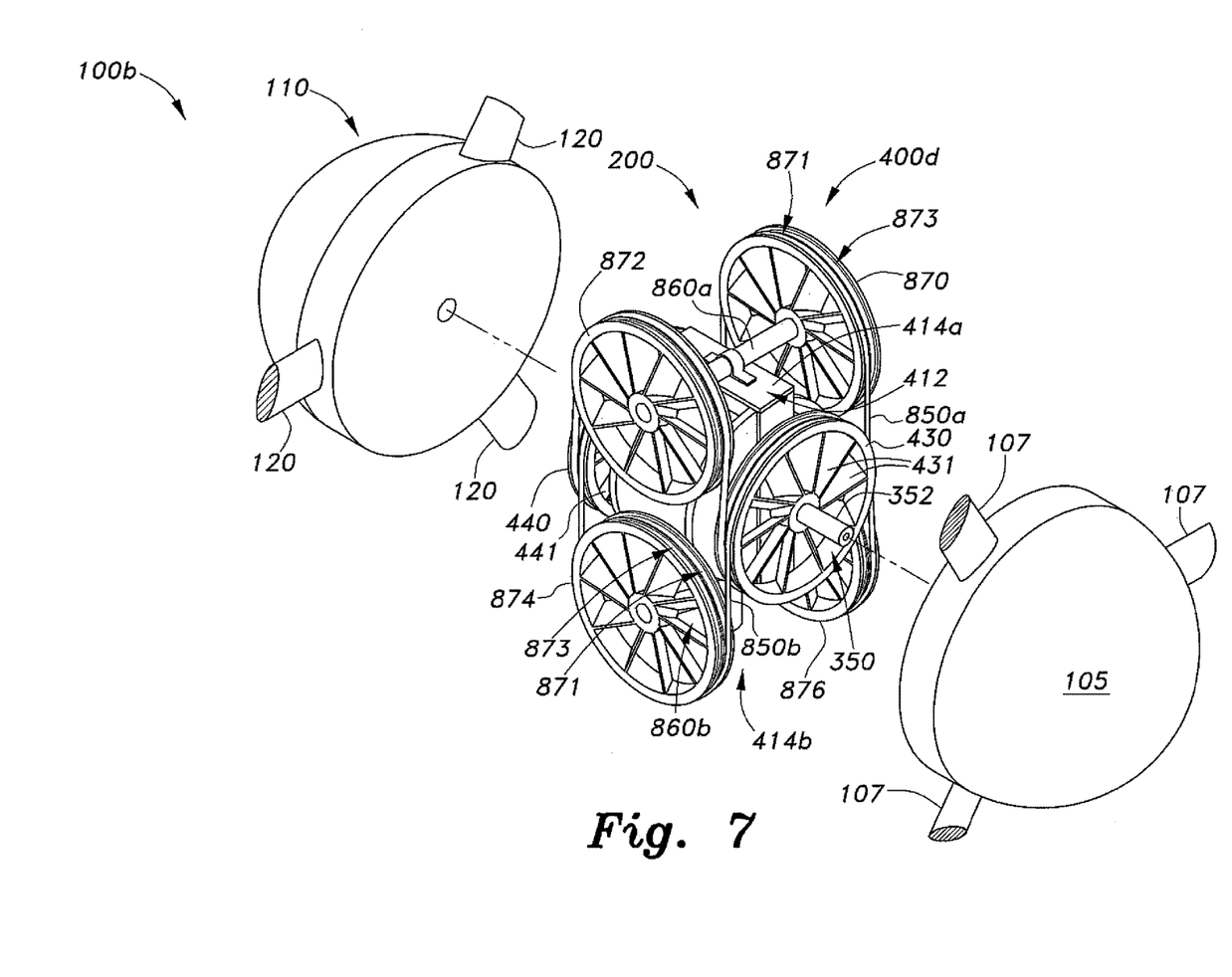
FIG. 7 is a partially exploded perspective view of a fifth embodiment of a drive system for wind turbine with contra-rotating generator according to the present invention, the turbine having contra-rotating propeller rotors, the housing being removed to show the drive system having two belts and six pulleys.

FIG. 7 depicts a fourth configuration of a belt-pulley assembly, generally designated 400d, that can be used in connection with the drive assembly 200. The belt-pulley assembly 400d is substantially similar to the belt-pulley assembly 400a. However, the belt-pulley assembly 400d includes a pair of secondary shafts, including a first secondary shaft 860a rigidly mounted on the center of the first horizontal support panel 414a of the support structure 412 and a second secondary shaft 860b rigidly mounted on the center of the second horizontal support panel 414b of the support structure 412. The assembly 400d also includes a plurality of large idler pulley wheels, including a first large idler pulley wheel 870, a second large idler pulley wheel 872, a third large idler pulley wheel 874, and a fourth large idler pulley wheel 876. The first large idler pulley wheel 870 and the second large idler pulley wheel 872 are coaxially positioned on the first secondary shaft 860a, and the third large idler pulley wheel 874 and the fourth large idler pulley wheel 876 are coaxially positioned on the second secondary shaft 860b. The plurality of large idler pulley wheels 870, 872, 874, and 876 may be double sheave pulleys, having a first groove 871 and a second groove 873, and the primary pulley wheels 430, 440 are double sheave pulleys.

Further, the belt-pulley assembly 400d includes a pair of endless belts, including a first endless belt 850a and a second endless belt 850b. The first endless belt 850a is trained on the first or inner groove 432a of the first primary pulley wheel 430, the first grooves 871 of each large upper idler pulley wheel 870, 872, and the second or outer groove 442b of the second primary pulley wheel 440, passing over the idler wheels 870, 872 and under the primary wheels 430, 440. The second endless belt 850b is trained on the second or inner groove 432b of the first primary pulley wheel 430, the second grooves 873 of each large lower idler pulley wheel 874, 876, and the first or outer groove 442a of the second primary pulley wheel 440, passing under the idler wheels 874, 876 and over the primary wheels 430, 440. In this configuration, the primary pulley wheels 430, 440 (and the attached magnetic rotor shaft and armature shaft are constrained to rotate in opposite directions. It will be noted that in this embodiment, the turbine has a two contra-rotating propeller rotors 105, 110, and the belt drive has four idler pulleys and two primary pulleys, as in FIG. 4, but unlike the embodiment of FIG. 4, has the idle pulleys aligned vertically instead of horizontally, uses double sheave pulleys for the primary pulley wheels, and uses two endless belts routed over the pulleys to maintain counter rotation of the magnetic rotor and armature, to balance torque of the contra-rotating propeller rotors 105, 110, to reduce vibration, and to synchronize rotation of the generator shafts.

It is to be understood that the present invention is not limited to the embodiments described above, but encompasses any and all embodiments within the scope of the following claims.

I claim:

1. A drive system for a wind turbine, the wind turbine including a contra-rotating generator having a magnetic field rotor mounted on a first shaft and an armature mounted on a second shaft, the first and second generator shafts being rotatable in opposite directions to generate an electromotive force, the turbine having at least one propeller rotor adapted for capturing wind energy, the drive system comprising:
   a frame adapted for mounting around the contra-rotating generator;
   a first primary pulley adapted for rigid attachment to the first shaft;
   a second primary pulley adapted for rigid attachment to the second shaft;
   a plurality of idler pulleys mounted on the frame between the first and second primary pulleys; and
   at least one endless belt extending over the first primary pulley, the plurality of idler pulleys, and the second primary pulley so that the first generator shaft and the second generator shaft are constrained to rotate in opposite directions.

2. The drive system according to claim 1, wherein:
the plurality of idler pulleys consists of two pairs of coaxially aligned idler pulley wheels disposed in a horizontal plane above the first and second primary pulleys; and
said at least one endless belt consists of one endless belt, the belt extending under the first and second primary pulleys and over the two pairs of idler pulley wheels to define an inverted "U" shape when viewed laterally.

3. The drive system according to claim 2, wherein the wind turbine has a single propeller rotor adapted for rigid attachment to the first shaft or the second shaft of the generator.

4. The drive system according to claim 2, wherein the wind turbine has two contra-rotating propeller rotors adapted for rigid attachment to the first shaft and the second shaft of the generator, respectively.

5. The drive system according to claim 1, wherein:
the plurality of idler pulleys consists of two pairs of coaxially aligned idler pulley wheels disposed in a vertical plane between the first and second primary pulleys, including an upper pair of idler pulley wheels and a lower pair of idler pulley wheels;
said first primary pulley and said second primary pulley each comprise a double sheave pulley; and
said at least one endless belt consists of two endless belts, including a first endless belt extending under the first and second primary pulleys and over the upper pair of idler pulley wheels, and a second endless belt extending over the first and second primary pulleys and under the lower pair of idler pulley wheels.

6. The drive system according to claim 5, wherein the wind turbine has a single propeller rotor adapted for rigid attachment to the first shaft or the second shaft of the generator.

7. The drive system according to claim 5, wherein the wind turbine has two contra-rotating propeller rotors adapted for rigid attachment to the first shaft and the second shaft of the generator, respectively.

8. The drive system according to claim 1, wherein:
the plurality of idler pulleys comprises two pairs of coaxially aligned upper idler pulley wheels disposed in a horizontal plane above the first and second primary pulleys, and two pairs of coaxially aligned lower idler pulley wheels disposed in a horizontal plane below the first and second primary pulleys;
said first primary pulley and said second primary pulley each comprise a double sheave pulley; and
said at least one endless belt consists of two endless belts, including a first endless belt extending under the first and second primary pulleys and over the two upper pairs of idler pulley wheels, and a second endless belt extending over the first and second primary pulleys and under the two lower pair of idler pulley wheels.

9. The drive system according to claim 8, wherein the wind turbine has a single propeller rotor adapted for rigid attachment to the first shaft or the second shaft of the generator.

10. The drive system according to claim 8, wherein the wind turbine has two contra-rotating propeller rotors adapted for rigid attachment to the first shaft and the second shaft of the generator, respectively.

11. The drive system according to claim 1, wherein:
the plurality of idler pulleys consists of a single pair of coaxially aligned idler pulley wheels disposed in a horizontal plane above the first and second primary pulleys; and
said at least one endless belt consists of one endless belt, the belt extending under the first and second primary pulleys and over the single pair of idler pulley wheels to define an inverted "U" shape when viewed laterally.

12. The drive system according to claim 11, wherein the wind turbine has a single propeller rotor adapted for rigid attachment to the first shaft or the second shaft of the generator.

13. The drive system according to claim 11, wherein the wind turbine has two contra-rotating propeller rotors adapted for rigid attachment to the first shaft and the second shaft of the generator, respectively.

14. A wind turbine, comprising:
a support post adapted for mounting vertically in the ground;
a nacelle rotatably mounted atop the pole, the nacelle being rotatable 360° atop the pole;
a contra-rotating generator mounted inside the nacelle, the contra-rotating generator having a magnetic field rotor mounted on a first shaft and an armature mounted on a second shaft, the first and second generator shafts being rotatable in opposite directions to generate an electromotive force;
at least one propeller rotor adapted for capturing wind energy rigidly coupled to the first or the second generator shaft;
a frame mounted around the contra-rotating generator;
a first primary pulley rigidly attached to the first shaft;
a second primary pulley rigidly attached to the second shaft;
a plurality of idler pulleys mounted on the frame between the first and second primary pulleys; and
at least one endless belt extending over the first primary pulley, the plurality of idler pulleys, and the second primary pulley so that the first generator shaft and the second generator shaft are constrained to rotate in opposite directions.

15. The wind turbine according to claim 14, wherein said at least one propeller rotor consists of a single propeller rotor rigidly attached to the first shaft or the second shaft of the generator.

16. The drive system according to claim 14, wherein said at least one propeller rotor comprises two contra-rotating propeller rotors rigidly attached to the first shaft and the second shaft of the generator, respectively.

17. The drive system according to claim 14, wherein:
the plurality of idler pulleys comprises at least one pair of coaxially aligned idler pulley wheels disposed in a horizontal plane above the first and second primary pulleys; and
said at least one endless belt consists of one endless belt, the belt extending under the first and second primary pulleys and over the at least one pair of idler pulley wheels to define an inverted "U" shape when viewed laterally.

18. The drive system according to claim 14, wherein:
the plurality of idler pulleys consists of two pairs of coaxially aligned idler pulley wheels disposed in a vertical plane between the first and second primary pulleys, including an upper pair of idler pulley wheels and a lower pair of idler pulley wheels;
said first primary pulley and said second primary pulley each comprise a double sheave pulley; and
said at least one endless belt consists of two endless belts, including a first endless belt extending under the first and second primary pulleys and over the upper pair of idler pulley wheels, and a second endless belt extending over the first and second primary pulleys and under the lower pair of idler pulley wheels.

19. The drive system according to claim 14, wherein:

the plurality of idler pulleys comprises two pairs of coaxially aligned upper idler pulley wheels disposed in a horizontal plane above the first and second primary pulleys, and two pairs of coaxially aligned lower idler pulley wheels disposed in a horizontal plane below the first and second primary pulleys;

said first primary pulley and said second primary pulley each comprise a double sheave pulley; and said at least one endless belt consists of two endless belts, including a first endless belt extending under the first and second primary pulleys and over the two upper pairs of idler pulley wheels, and a second endless belt extending over the first and second primary pulleys and under the two lower pair of idler pulley wheels.

* * * * *